United States Patent [19]
Miller

[11] Patent Number: 5,230,881
[45] Date of Patent: Jul. 27, 1993

[54] METHODS FOR PREPARING SUBSTANTIALLY PURE SAPO-31 SILICOALUMINOPHOSPHATE MOLECULAR SIEVE

[75] Inventor: Stephen J. Miller, San Francisco, Calif.

[73] Assignee: Chevron Research & Technology Co., San Francisco, Calif.

[21] Appl. No.: 880,104

[22] Filed: May 6, 1992

Related U.S. Application Data

[63] Continuation-in-part of Ser. No. 663,437, Mar. 1, 1991, abandoned.

[51] Int. Cl.$^5$ .............................................. C01B 33/34
[52] U.S. Cl. ............................ 423/705; 423/DIG. 30
[58] Field of Search ............... 423/326, 328, 329, 330, 423/305, 306, 700, 705, DIG. 30; 502/208, 214

[56] References Cited

U.S. PATENT DOCUMENTS 4,440,871  4/1984  Lok et al. ............................ 502/214

Primary Examiner—R. Bruce Breneman

[57] ABSTRACT

Disclosed herein is a process for preparing substantially pure crystalline SAPO-31 molecular sieve. In particular, disclosed are methods for preparing SAPO-31 which methods employ specified crystallization media with specified pHs. When such crystallization media are employed, the resulting SAPO-31 is substantially pure and has no contamination from crystalline SAPO-11 silicoaluminophosphate molecular sieve.

5 Claims, 1 Drawing Sheet

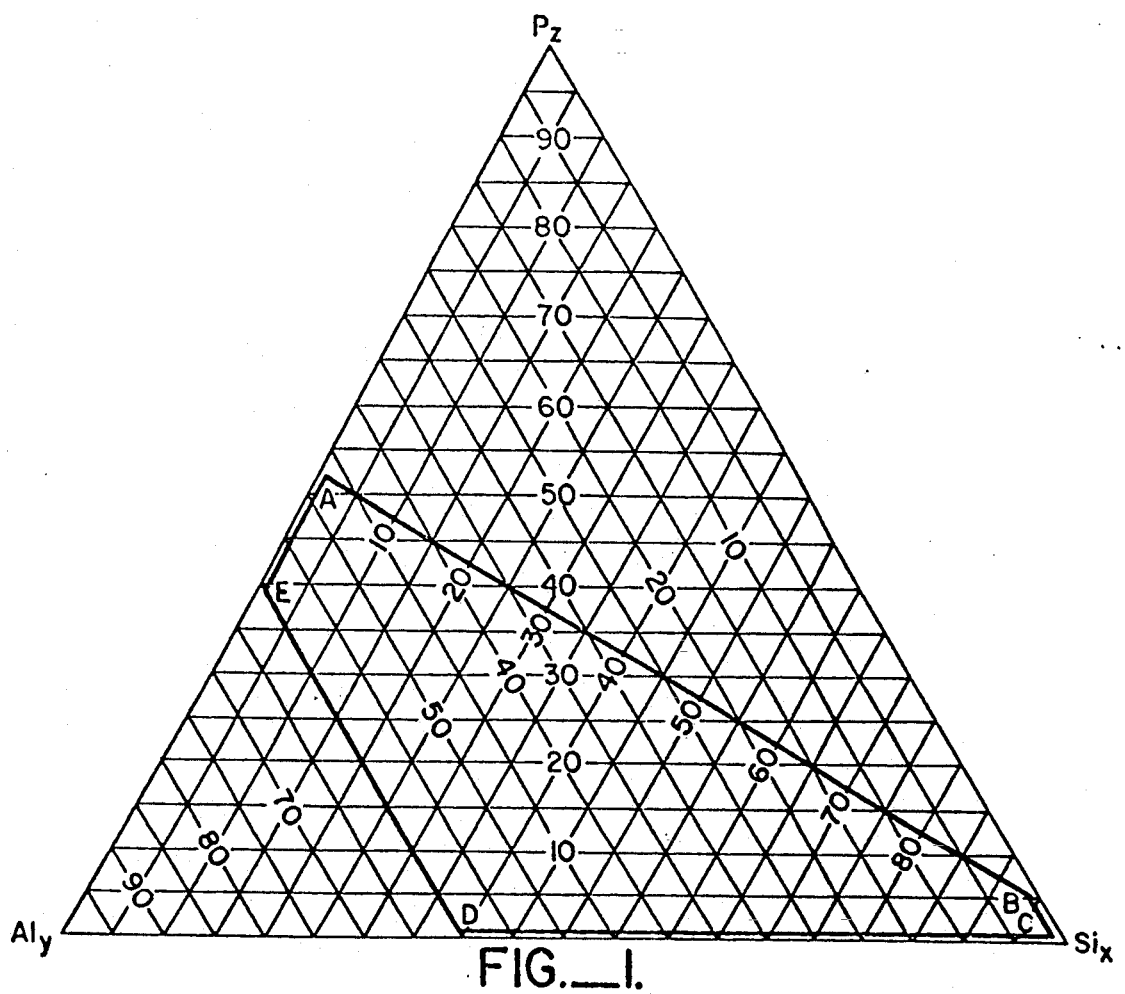
FIG.—1.

5,230,881

METHODS FOR PREPARING SUBSTANTIALLY PURE SAPO-31 SILICOALUMINOPHOSPHATE MOLECULAR SIEVE

CROSS-REFERENCE TO RELATED APPLICATIONS

This application is a continuation-in-part of U.S. Ser. No. 07/663,437 filed Mar. 1, 1991, now abandoned.

BACKGROUND OF THE INVENTION

1. Field of the Invention

The present invention is directed to methods for preparing substantially pure crystalline SAPO-31 silicoaluminophosphate molecular sieve ("SAPO-31"). In particular, the present invention is directed to methods for preparing SAPO-31 which methods employ specified crystallization media with specified pHs. When such crystallization media are employed, the resulting SAPO-31 is substantially pure.

2. Background of the Invention

Crystalline silicoaluminophosphate molecular sieves are well known in the art and are particularly useful as molecular sieve adsorbents and in hydrocarbon conversion processes. In particular, European Patent Application Publication No. 209 227, among others, describes dewaxing processes utilizing catalysts containing a crystalline silicoaluminophosphate molecular sieve and a hydrogenation metal such as platinum or palladium. In this reference, it is disclosed that one of the preferred silicoaluminophosphate molecular sieves for use in the therein described processes is SAPO-31. The preparation and characterization of crystalline silicoaluminophosphate molecular sieves are described in detail by Lok et al., U.S. Pat. No. 4,440,871, the disclosure of which is incorporated herein by reference. Such crystalline silicoaluminophosphate molecular sieves have threedimensional microporous crystal framework structures of $PO_2$, $AlO_2$ and $SiO_2$ tetrahedral units. A number of different crystalline silicoaluminophosphate molecular sieves have been synthesized, each with a characteristic crystal structure as evidenced by unique X-ray diffraction patterns for each structure. Crystalline silicoaluminophosphate molecular sieves are conventionally termed "SAPO" and each of the different SAPO crystal structures are referred to by separate numbers. For example, Lok et al., U.S. Pat. No. 4,440,871, describes the synthesis of numerous SAPO crystalline molecular sieves including, SAPO-5, SAPO-11, SAPO-16, SAPO-17, SAPO-20, SAPO-31, SAPO-34, SAPO-37, SAPO-40, SAPO-41, SAPO-42, SAPO-44 and the like.

It is also known in the art that in the synthesis of SAPO-31 to obtain a product of any significant purity the final reaction mixture was required to be seeded with at least 10 weight percent of SAPO-31 crystals. (See Examples 51 and 53 of Lok et al.). If SAPO-31 seed crystals were not used a detectable portion of the resulting crystalline material was not SAPO-31 but in fact has been attributed to some impurity. (See Example 52 of Lok et al.). Because of the very similar properties of the SAPO-31 molecular sieve and the impurity, purification techniques are not effective in removing the SAPO-31. Accordingly, heretofore, the art was not able to prepare substantially pure SAPO-31 without the addition of significant amounts of SAPO-31 seed crystals.

SUMMARY OF THE INVENTION

The present invention is directed to the discovery that substantially pure SAPO-31 can be prepared without seeding the final reaction mixture by employing SAPO-31 crystallization reaction media meeting defined parameters. In particular, in the present invention, the compositional parameters of the reaction medium prior to the crystallization step are set so as to inhibit formation of crystalline silicoaluminophosphate molecular sieves other than SAPO-31. This control of the reaction parameters permit the synthesis of substantially pure SAPO-31.

Accordingly the present invention is directed to a process for the synthesis of substantially pure crystalline SAPO-3 molecular sieve which process comprises:

(a) forming a reaction medium containing reactive sources of $SiO_2$, $Al_2O_3$, $P_2O_5$ and an organic templating agent, said reaction mixture having a pH from about 4.0 to about 5.5 and having a composition expressed in terms of molar oxide ratios of:

| | |
|---|---|
| $R/Al_2O_3$ | 0.6–1.2 |
| $P_2O_5/Al_2O_3$ | 0.9–1.1 |
| $SiO_2/Al_2O_3$ | 0.01–1.0 |
| $H_2O/Al_2O_3$ | 10–35 | wherein "R" is an organic templating agent; and (b) crystallizing the reaction mixture thus formed at a temperature of at least 100° C. until crystals of SAPO-31 are formed.

BRIEF DESCRIPTION OF THE DRAWINGS

FIG. 1 is a ternary diagram showing the compositional parameters of the crystalline SAPO-31 molecular sieve in terms of mole fractions of silicon, aluminum, and phosphorus.

FIG. 2 is a ternary diagram showing the preferred compositional parameters of the crystalline SAPO-31 molecular sieve in terms of mole fractions of silicon, aluminum, and phosphorus.

DETAILED DESCRIPTION OF THE PREFERRED EMBODIMENTS

The present invention is directed to a process for the preparation of substantially pure crystalline SAPO-31 molecular sieve. The process of this invention utilizes specified SAPO reaction parameters so as to insure that substantially pure SAPO-31 is formed. As used herein, the term "substantially pure SAPO-31" means that the crystalline SAPO-31 molecular sieve formed by the crystallization medium employed in the present invention will contain less than 10 weight percent of other crystalline SAPO molecular sieves, including SAPO-11. Preferably, the crystalline SAPO-31 molecular sieve formed by the process of this invention will not contain any detectable amount of other crystalline SAPO molecular sieves, including SAPO-11, as detected by X-ray powder diffraction of a crystal sample of the SAPO-31.

Substantially pure crystalline SAPO-31 molecular sieve (sometimes referred to herein as SAPO-31) is generally synthesized by hydrothermal crystallization from a reaction mixture comprising reactive sources of silicon, aluminum and phosphorus, and one or more organic templating agents. Prior to crystallizing this reaction mixture, it is critical that the pH of the mixture be adjusted to a range so as to inhibit formation of other SAPO molecular sieves (including SAPO-11) during the crystallization of SAPO-31. Preferably, the pH of the mixture is adjusted to a pH of between about 4.0 to about 5.5 more preferably, to a pH of between about 4.5 and about 5.5. Adjustment of the pH is generally accomplished by the addition of a sufficient amount of a compatible acid, i.e., an acid which does not interfere with the synthesis of SAPO-31. Suitable compatible acids include, for example, mineral acids such as hydrochloric acid, nitric acid, sulfuric acid and the like.

The reaction mixture is then placed in a sealed pressure vessel, preferably lined with an inert plastic material, such as polytetrafluoroethylene, and heated, preferably under autogenous pressure at a temperature of at least about 100° C., preferably between 100° C. and 250° C., more preferably between 125° C. and 225° C., until crystals of SAPO-31 are obtained, usually for a period of from 2 hours to 2 weeks. While not essential to the synthesis of substantially pure SAPO-31, it has been found that in general, stirring or other moderate agitation of the reaction mixture facilitates the crystallization procedure. The product is recovered by any convenient method such as centrifugation or filtration.

After crystallization, the substantially pure SAPO-31 composition may be isolated and washed with water and dried in air. As a result of the hydrothermal crystallization, the as-synthesized SAPO-31 contains within its intracrystalline pore system at least one form of the template employed in its formation. Generally, the template is a molecular species, but it is possible, steric considerations permitting, that at least some of the template is present as a charge-balancing cation. Generally the template is too large to move freely through the intracrystalline pore system of the formed SAPO-31 and may be removed by a post-treatment process, such as by calcining SAPO-31 at temperatures of between about 200° C. and about 700° C. so as to thermally degrade the template, or by employing some other post-treatment process for removal of at least part of the template from SAPO-31. In some instances, the pores of SAPO-31 are sufficiently large to permit transport of the template, and, accordingly, complete or partial removal thereof can be accomplished by conventional desorption procedures such as are carried out in the case of zeolites.

SAPO-31 is preferably formed from a reaction mixture having a mole fraction of alkali metal cation which is sufficiently low that it does not interfere with the formation of SAPO-31.

The preferred compositional parameters for the reaction mixture employed to prepare substantially pure SAPO-31, expressed as molar ratios of oxides, are:

| | |
|---|---|
| R/Al$_2$O$_3$ | 0.6–1.2 |
| P$_2$O$_5$/Al$_2$O$_3$ | 0.9–1.1 |
| SiO$_2$/Al$_2$O$_3$ | 0.01–1.0 |
| H$_2$O/Al$_2$O$_3$ | 10–35 |

More preferably, the composition is as follows:

| | |
|---|---|
| R/Al$_2$O$_3$ | 0.8–1.0 |
| P$_2$O$_5$/Al$_2$O$_3$ | 0.95–1.05 |
| SiO$_2$/Al$_2$O$_3$ | 0.05–1.0 |
| H$_2$O/Al$_2$O$_3$ | 10–25 |

The reaction mixture from which SAPO-31 is formed contains one or more organic templating agents (templates). The preferred organic template, R, is selected from di-n-propylamine and di-isopropylamine or mixtures thereof.

The resulting crystalline SAPO-31 molecular sieve is an acidic intermediate pore size silicoaluminophosphate molecular sieve comprising a molecular framework of corner-sharing [SiO$_2$] tetrahedra, [AlO$_2$] tetrahedra and [PO$_2$] tetrahedra, [i.e., (Si$_x$Al$_y$P$_z$)O$_2$ tetrahedral units]. In particular, crystalline SAPO-31 comprises a silicoaluminophosphate having a three-dimensional microporous crystal framework of [PO$_2$], [AlO$_2$] and [SiO$_2$] tetrahedral units whose unit empirical formula on an anhydrous basis is:

$$mR:(Si_xAl_yP_z)O_2 \tag{1}$$

wherein R represents at least one organic templating agent present in the intracrystalline pore system; "m" represents the moles of "R" present per mole of (Si$_x$Al$_y$P$_z$)O$_2$ and has a value of from zero to 0.3; "x", "y" and "z" represent respectively, the mole fractions of silicon, aluminum and phosphorus, said mole fractions being within the compositional area bounded by points A, B, C, D and E on the ternary diagram of FIG. 1, or preferably within the area bounded by points a, b, c, d and e on the ternary diagram of FIG. 2, said silicoaluminophosphate having a characteristic X-ray powder diffraction pattern (as synthesized and calcined) which contains at least the d-spacings set forth below in Table I. When SAPO-31 is in the as-synthesized form, "m" preferably has a value of from 0.02 to 0.3.

TABLE I

| 2θ | d (Å) | Relative Intensity |
|---|---|---|
| 8.5–8.6 | 10.40–10.28 | m-s |
| 20.2–20.3 | 4.40–4.37 | med |
| 21.9–22.1 | 4.06–4.02 | w-m |
| 22.6–22.7 | 3.93–3.92 | vs |
| 31.7–31.8 | 2.823–2.814 | w-m | vs - very strong
m-s - medium-strong
med - medium
w-m - weak-medium

All of the as-synthesized SAPO-31 compositions for which X-ray powder diffraction data have presently been obtained have patterns which are within the generalized pattern of Table II below.

TABLE II

| 2θ | d (Å) | 100 × I/I$_o$ |
|---|---|---|
| 6.1 | 14.5 | 0–1 |
| 8.5–8.6* | 10.40–10.28 | 60–72 |
| 9.5* | 9.31 | 7–14 |
| 13.2–13.3* | 6.71–6.666 | 1–4 |
| 14.7–14.8 | 6.03–5.99 | 1–2 |
| 15.7–15.8* | 5.64–5.61 | 1–8 |
| 17.05–17.1 | 5.20–5.19 | 2–4 |
| 18.3–18.4 | 4.85–4.82 | 2–3 |
| 20.2–20.3 | 4.40–4.37 | 44–55 |
| 21.1–21.2* | 4.21–4.19 | 6–28 |
| 21.9–22.1* | 4.06–4.02 | 32–38 |
| 22.6–22.7* | 3.93–3.92 | 100 |
| 23.3–23.35* | 3.818–3.810 | 2–20 |
| 25.1* | 3.548 | 3–4 |
| 25.65–25.75 | 3.473–3.460 | 2–3 |
| 26.5* | 3.363 | 1–4 |
| 27.9–28.0 | 3.198–3.187 | 8–10 |
| 28.7* | 3.110 | 0–2 |
| 29.7 | 3.008 | 4–5 |
| 31.7–31.8 | 2.823–2.814 | 15–18 |
| 32.9–33.0* | 2.722–2.714 | 0–3 |
| 35.1–35.2 | 2.557–2.550 | 5–8 |

TABLE II-continued

| 2θ | d (Å) | 100 × I/I₀ |
|---|---|---|
| 36.0–36.1 | 2.495–2.488 | 1–2 |
| 37.2 | 2.417 | 1–2 |
| 37.9–38.1* | 2.374–2.362 | 2–4 |
| 39.3 | 2.292 | 2–3 |
| 43.0–43.1* | 2.103–2.100 | 1 |
| 44.8–45.2* | 2.023–2.006 | 1 |
| 46.6 | 1.949 | 1–2 |
| 47.4–47.5 | 1.918 | 1 |
| 48.6–48.7 | 1.873–1.870 | 2 |
| 50.7–50.8 | 1.801–1.797 | 1 |
| 51.6–51.7 | 1.771–1.768 | 2–3 |
| 55.4–55.5 | 1.658–1.656 | 1 |

*Possibly contains peak from impurity

The unit empirical formula for SAPO-31 may be given on an "as-synthesized" basis or may be given after the "as-synthesized" SAPO-31 composition has been subjected to some post treatment process, e.g., calcined. The term "as-synthesized" herein shall be used to refer to the SAPO-31 composition formed as a result of the hydrothermal crystallization but before the SAPO-31 composition has been subjected to post treatment to remove any volatile components present therein. The actual value of "m" for the post-treated SAPO-31 will depend on several factors (including the particular template, severity of the post-treatment in terms of its ability to remove the template from SAPO-31, and the proposed application of the SAPO-31 composition). The value for "m" can be within the range of values as defined for the as-synthesized SAPO-31 compositions although such is generally less than the as-synthesized SAPO-31 unless such post-treatment process adds template to the SAPO so treated. The SAPO-31 composition which is in the calcined or other post-treated form generally has an empirical formula represented by Formula (1), except that the value of "m" is generally less than about 0.02. Under sufficiently severe post-treatment conditions, e.g., roasting in air at high temperature for long periods (over 1 hr.), the value of "m" may be zero or, in any event, the template, R, is undetectable by normal analytical procedures. In general, calcination of the SAPO-31 composition is generally conducted from about 200° C. to about 700° C. for a period of from about 0.1 to about 20 hours.

The SAPO-31 may contain other elements in the three dimensional oxide framework besides silicon, aluminum, and phosphorus. For example, molecular sieves, referred to as "ELAPSO", additionally contain, for example, one or more metals such as magnesium, manganese, zinc, chromium, cobalt, titanium and the like. Such ELAPSO molecular sieves are described in U.S. Pat. No. 4,793,984, which is incorporated herein by reference.

As noted above, SAPO-31 functions well as a molecular sieve adsorbent. Additionally, catalysts containing SAPO-31 in admixture with at least one hydrogenation component, such as platinum, palladium, tungsten, vanadium, molybdenum, nickel, cobalt, chromium, and manganese, are excellent dewaxing catalysts (sometimes referred to as "catalysts"). Combinations of these metals such as cobalt-molybdenum, cobalt-nickel, nickel-tungsten or cobalt-nickel-tungsten, are also useful With such catalysts. Such catalysts generally comprise SAPO-31 and from about 0.01% to 10%, preferably from about 0.1% to about 5% of the hydrogenation component by weight of SAPO-31. Preferred hydrogenation components are platinum and palladium and, when employed, are preferably employed between about 0.1 percent and 1.5 percent by Weight of SAPO-31.

The techniques of introducing catalytically active metals into SAPO-31 are disclosed in the literature, and preexisting metal incorporation techniques and treatment of the molecular sieve to form an active catalyst are suitable, e.g., ion exchange, impregnation or by occlusion during sieve preparation. See, for example, U.S. Pat. Nos. 3,236,761; 3,226,339; 3,236,762; 3,620,960; 3,373,109; 4,202,996; and 4,440,871 which are incorporated herein by reference.

The term "hydrogenation metal" as used herein means one or more metals in its elemental state or in some form such as the sulfide or oxide and mixtures thereof. As is customary in the art of catalysis, the terms "active metal or metals" is intended to encompass the existence of such metal in the elementary state or in some form such as the oxide or sulfide as mentioned above. Regardless of the state in which the metallic component actually exists, the concentrations are computed as if they existed in the elemental state.

The physical form of SAPO-31 depends on the type of catalytic reactor being employed and may be in the form of a granule or powder, and is desirably compacted into a more readily usable form (e.g., larger agglomerates), usually with a silica or alumina binder for fluidized bed reaction, or pills, prills, spheres, extrudates, or other shapes of controlled size to accord adequate catalyst-reactant contact.

SAPO-31 may be composited with other materials resistant to the temperatures and other conditions employed in the process. Such matrix materials include active and inactive materials and synthetic or naturally occurring zeolites as well as inorganic materials such as clays, silica and metal oxides. The latter may be either naturally occurring or in the form of gelatinous precipitates, sols or gels including mixtures of silica and metal oxides. Inactive materials suitably serve as diluents to control the amount of conversion in a given process so that products can be obtained economically without employing other means for controlling the rate of reaction. SAPO-31 may be incorporated into naturally occurring clays, e.g., bentonite and kaolin. These materials, i.e., clays, oxides, etc., function, in part, as binders for the catalyst. It is desirable to provide a catalyst having good crush strength, because in petroleum refining the catalyst is often subjected to rough handling. This tends to break the catalyst down into powder-like materials which cause problems in processing.

Naturally occurring clays which can be composited with the catalyst include the montmorillonite and kaolin families, which families include the sub-bentonites, and the kaolins commonly known as Dixie, McNamee, Ga. and Florida clays or others in which the main mineral constituent is halloysite, kaolinite, dickite, nacrite, or anauxite. Fibrous clays such as halloysite, sepiolite and attapulgite can also be used as supports. Such clays can be used in the raw state as originally mined or initially subjected to calcination, acid treatment or chemical modification.

In addition to the foregoing materials, the catalysts may be composited with porous inorganic oxide matrix materials and mixtures of matrix materials such as silica, alumina, titania, magnesia, silica-alumina, silica-magnesia, silica-zirconia, silica-thoria, silica-beryllia, silica-titania, titania-zirconia as well as ternary compositions such as silica-alumina-thoria, silica-alumina titania, silica-alumina-magnesia and silica-magnesia-zirconia. The matrix can be in the form of a co-gel.

The invention will be further illustrated by the following examples, which are intended to be purely exemplary of the invention.

EXAMPLES

Comparative Example A

SAPO-31 can be crystallized from a reaction mixture prepared by combining 81.7 grams of aluminum isopropoxide [Al(OC$_3$H$_7$)$_3$] with 46.1 grams of 85 weight percent orthophosphoric acid (H$_3$PO$_4$) and 85.0 grams of water and stirring until homogeneous. To the mixture was added 24.0 grams of an aqueous sol of 30 weight percent of silica and 42.8 grams of water, and the mixture was stirred until homogeneous. To this mixture was added 20.2 grams of di-n-propylamine (Pr$_2$NH) and 34.0 grams of water, and the mixture was stirred until homogeneous. To this mixture was added 5.8 grams of AlPO$_4$-31 seed crystals and the mixture stirred until homogeneous. The pH of the composition of this final reaction mixture was about 6.1 and this mixture comprised the following components, expressed as molar ratios of oxides:

| | |
|---|---|
| R/Al$_2$O$_3$ | 1:1 |
| P$_2$O$_5$/Al$_2$O$_3$ | 1:1 |
| SiO$_2$/Al$_2$O$_3$ | 0.67:1 |
| H$_2$O/Al$_2$O$_3$ | 51:1 |

A portion of this reaction mixture is placed in a stainless steel pressure vessel lined with an inert plastic material and is heated in an oven at 200° C. at autogenous pressure for 24 hours. The solid reaction product is recovered by filtration, washed with water, and dried in air at 100° C. The chemical composition of the SAPO-31 product in terms of molar oxide ratios (anhydrous basis) is:

0.16 (Pr$_2$NH): Al$_2$O$_3$: 0.15 SiO$_2$: 0.83 P$_2$O$_5$ which corresponds to the formula:

0.04 Pr$_2$NH: (Si$_{0.04}$Al$_{0.53}$P$_{0.43}$)O$_2$.

The X-ray powder diffraction pattern of the SAPO-31 containing product is characterized by the data in TABLE II above:

The above data suggests that to prepare substantially pure SAPO-31 with the mixture composition of this example, it is necessary to use in the final reaction mixture at least 10 weight percent SAPO-31 seed crystals.

EXAMPLE 1

A reaction mixture was prepared by combining 57.8 grams of 85 weight percent orthophosphoric acid (H$_3$PO$_4$) and 30 grams of distilled water, which was added to 102.1 grams of aluminum isopropoxide [Al(OC$_3$H$_7$)$_3$] and the mixture stirred well. To the mixture was added an aqueous sol containing 26.1 grams of a silica source (Ludox AS30 available from Dupont), and 4 grams of water and the mixture stirred until homogeneous. To this reaction mixture was added 22.8 grams of di-n-propylamine (Pr$_2$NH) and the reaction mixture stirred until homogeneous.

The weight of the final reaction mixture was 191.0 grams instead of the 243.2 grams expected due to loss of some isopropanol by evaporation. The chemical composition of the reaction mixture in terms of molar oxide ratios was:

0.9(Pr$_2$NH): Al$_2$O$_3$: 0.5 SiO$_2$: 1.0 P$_2$O$_5$: 14H$_2$O

The pH of this mixture was 6.5. The pH of half of the final reaction mixture was adjusted to about 5.3 by the addition of 10 cc of nitric acid. The reaction mixture was then placed in a stainless steel pressure vessel lined with an inert plastic material and was heated in an oven at 150° C. at autogenous pressure for 168 hours. The solid reaction product was recovered by filtration, washed with water, dried overnight at 121° C., and then calcined in air for 8 hours at 538° C. The calcined product was identified as SAPO-31 by X-ray diffraction analysis.

The X-ray powder diffraction pattern of the SAPO-31 containing product is characterized by the data in TABLE III below:

TABLE III

SAPO-31 X-RAY DIFFRACTION PATTERN
(Cu K ALPHA AVERAGE)

| 2θ (±0.1 Degrees) | 100 × I/I$_o$ | d (Å) | 2θ | 100 × I/I$_o$ | d (Å) |
|---|---|---|---|---|---|
| 8.4 | 100 | 10.5 | 22.9 | .15 | 3.88 |
| 9.7 | 10 | 9.1 | 25.2 | 5 | 3.53 |
| 13.5 | 10 | 6.55 | 25.6 | 5 | 3.48 |
| 14.7 | 5 | 6.02 | 27.2 | 2 | 3.28 |
| 16.0 | 10 | 5.53 | 28.0 | 10 | 3.18 |
| 17.0 | 10 | 5.21 | 29.7 | 10 | 3.00 |
| 18.5 | 5 | 4.79 | 30.3 | 5 | 2.95 |
| 20.3 | 45 | 4.37 | 31.7 | 15 | 2.82 |
| 21.5 | 15 | 4.13 | 35.2 | 5 | 2.55 |
| 22.0 | 40 | 4.04 | 36.2 | 3 | 2.48 |
| 22.6 | 65 | 3.93 | | | |

The above data demonstrates that the use of a reaction composition having requisite ratios of reagents and also having a pH of between 4.0 and 5.5 results in the formation of substantially pure SAPO-31 without adding any SAPO-31 seed crystals to the final reaction mixture.

COMPARATIVE EXAMPLE B

The procedure of Example 1 was repeated, except that the pH of the reaction mixture was not adjusted, so that the pH of the mixture going into the pressure vessel was 6.5. The calcined product was identified by X-ray diffraction analysis as SAPO-11 with a minor amount of SAPO-31.

EXAMPLE 2

A reaction mixture was prepared by combining 57.8 grams of 85 weight percent H$_3$PO$_4$ and 30 grams of distilled water, which was added to 33.6 grams of Catapal SB alumina (76% Al$_2$O$_3$, 24 wt % H$_2$O - available from Vista Chemical, Houston, Tex.) and the mixture stirred well. To the mixture was added 26.1 grams of Ludox AS-30 and 2 grams of water and the mixture stirred until homogeneous. To this mixture was added 22.8 grams of di-n-propylamine and the reaction mixture stirred until homogeneous. The pH of the mixture was 5.0. The chemical composition in terms of molar oxide ratios was:

0.9 Pr$_2$NH: 0.5 SiO$_2$: 1.0 Al$_2$O$_3$: 1.0 P$_2$O$_5$: 15 H$_2$O

The reaction mixture was place in a Teflon bottle in a stainless steel pressure vessel and heated for 7 days at 175° C. with no stirring and was maintained under autogenous pressure. The product was then filtered, washed with water, dried overnight at 121° C., and the calcined in air for 8 hours at 538° C. The calcined product was identified by X-ray diffraction analysis as SAPO-31 as in Table III above. The anhydrous molar composition of the calcined sieve was:

$$0.5\ SiO_2: Al_2O_3: P_2O_5.$$

EXAMPLE 3

57.8 grams of 85% $H_3PO_4$ were added to 50 grams of distilled $H_2O$ in a Teflon beaker, with the beaker maintained in an ice bath. 33.6 grams of Catapal SB alumina were slowly added with mixing and then mixed until homogeneous. Then 26.1 grams of Ludox AS-30 and 2 grams of water were added with mixing. Next 22.8 grams of di-n-propylamine were added with mixing. The mixture had a pH of 4.5 and the following composition, expressed in molar ratios of oxides:

$$0.9\ Pr_2NH: 0.5\ SiO_2: 1.0\ Al_2O_3: 1.0\ P_2O_5: 20\ H_2O$$

The mixture was placed in a Teflon bottle in a stainless steel pressure vessel and heated for 7 days at 175° C. with no stirring and maintained under autogenous pressure. The supernatant liquid was removed and the product was filtered, washed with water, dried overnight at 121° C., and calcined in air for 8 hours at 538° C. The calcined product was identified by X-ray diffraction analysis as SAPO-31 as in Table III above.

EXAMPLE 4

226 grams of 85% $H_3PO_4$ were added to 311 grams of distilled water in a Teflon beaker, with the beaker maintained in an ice bath. 134.4 grams of Catapal SB alumina were slowly added with mixing and then mixed until homogeneous. Then 32.8 grams of fumed silica (Cab-O-Sil M-5, available from Cabot Corp., Tuscola, Fla.) were added with mixing. Next 91.2 grams of di-n-propylamine were added with mixing. The pH of the mixture was 4.6. The chemical composition in terms of molar oxide ratios was:

$$0.9\ Pr_2NH: 0.5\ SiO_2: 1.0\ Al_2O_3: 1.0\ P_2O_5: 21\ H_2O.$$

The mixture was placed in a Teflon bottle in a stainless steel pressure vessel and heated for 5 days at 200° C. with no stirring while maintained under autogenous pressure. The supernatant liquid was removed and the product was filtered, washed with water, dried for 8 hours at 121° C., and calcined in air for 8 hours at 566° C. The calcined product was identified by X-ray diffraction analysis as SAPO-31 as in Table III above. The anhydrous molar composition of the calcined sieve was:

$$0.5\ SiO_2: 1.0\ Al_2O_3: 1.0\ P_2O_5$$

COMPARATIVE EXAMPLE C 228 grams of 85% $H_3PO_4$ were added to 960 grams of distilled water in a Teflon beaker, with the beaker in an ice bath. 132.5 grams of Catapal B alumina (77% $Al_2O_3$, 23.0% $H_2O$) were slowly added with mixing and then mixed until homogeneous. Then 30 grams of Cab-O-Sil M-5 were added with mixing. Next 100 grams of di-n-propylamine were added with mixing. The pH of the mixture was 3.4. The chemical composition in terms of molar oxide ratios was:

$$1.0\ Pr_2NH: 0.5\ SiO_2: 1.0\ Al_2O_3: 1.0\ P_2O_5: 57\ H_2O$$

The mixture was placed in a Teflon bottle in a stainless steel pressure vessel and heated for 5 days at 200° C. with no stirring while maintained under autogenous pressure. The supernatant liquid was removed and the product was filtered, washed with water, dried overnight at 121° C., and calcined in air for 8 hours at 566° C. The calcined product was identified by X-ray diffraction analysis as SAPO-11 with a minor amount of SAPO-31.

COMPARATIVE EXAMPLE D 228 grams of 85% $H_3PO_4$ were added to 400 grams of distilled water in a Teflon beaker, with the beaker maintained in an ice bath. 143.9 grams of Catapal B alumina (70.9% $Al_2O_3$, 29.1% $H_2O$) were slowly added with mixing and then mixed until homogeneous. Then 140 grams of di-n-propylamine were added with mixing, followed by 30 grams of Cab-O-Sil M-5 silica and mixed until homogeneous. The pH of the mixture was 4.1. An additional 20 grams of di-n-propylamine were added with mixing, bringing the pH of the reaction mixture to 5.6. The chemical composition of the reaction mixture in terms of molar oxide ratios was:

$$1.6\ Pr_2NH: 0.5\ SiO_2: 1.0\ Al_2O_3: 1.0\ P_2O_5: 26\ H_2O$$

The mixture was placed in a Teflon bottle in a stainless steel pressure vessel and heated for 5 days at 200° C. with no stirring while being maintained under autogenous pressure. The supernatant liquid was removed and the product was filtered, washed with water, dried for 8 hours at 121° C., and calcined in air for 8 hours at 566° C. The calcined product was identified by X-ray diffraction analysis as a mixture of SAPO-11 and SAPO-31.

What is claimed is:

1. A process for the synthesis of substantially pure crystalline SAPO-31 molecular sieve which process comprises:
    (a) forming a reaction medium containing reactive sources of $SiO_2$, $Al_2O_3$, and $P_2O_5$ and an organic templating agent, said reaction mixture having a pH of from about 4.0 to about 5.5 and having a composition expressed in terms of molar oxide ratios of:

| | |
|---|---|
| $R/Al_2O_3$ | 0.6–1.2 |
| $P_2O_5/Al_2O_3$ | 0.9–1.1 |
| $SiO_2/Al_2O_3$ | 0.01–1.0 |
| $H_2O/Al_2O_3$ | 10–35 | wherein "R" is an organic templating agent selected from the group consisting of di-n-propylamine, diisopropylamine and mixtures thereof; and
    (b) crystallizing the reaction mixture thus formed at a temperature of at least 100° C. until crystals of SAPO-31 are formed.

2. The process as defined in claim 1 wherein the pH of the reaction mixture is adjusted to a pH of between about 4.5 and 5.5.

3. The process as defined in claim 1 wherein said reaction mixture having a composition expressed in terms of molar oxide ratios of:

| | |
|---|---|
| R/Al$_2$O$_2$ | 0.8–1.0 |
| P$_2$O$_5$/Al$_2$O$_3$ | 0.95–1.05 |
| SiO$_2$/Al$_2$O$_3$ | 0.05–1.0 |
| H$_2$O/Al$_2$O$_3$ | 10–25 |

4. The process as defined in claim 1, wherein said crystal of SAPO-31 contains less than about 10 weight percent of other crystalline molecular sieves.

5. The process in accordance with claim 4, wherein said crystals of SAPO-31 contain less than about 5 weight percent of other crystalline molecular sieves.

* * * * *